United States Patent
Albero et al.

(10) Patent No.: US 11,785,036 B2
(45) Date of Patent: *Oct. 10, 2023

(54) REAL-TIME VALIDATION OF DATA TRANSMISSIONS BASED ON SECURITY PROFILES

(71) Applicant: Bank of America Corporation, Charlotte, NC (US)

(72) Inventors: George Albero, Charlotte, NC (US); Guisen Saffel, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/680,529

(22) Filed: Feb. 25, 2022

(65) Prior Publication Data

US 2022/0182405 A1 Jun. 9, 2022

Related U.S. Application Data

(63) Continuation of application No. 16/736,987, filed on Jan. 8, 2020, now Pat. No. 11,297,085.

(51) Int. Cl.
*H04L 9/00* (2022.01)
*H04W 12/08* (2021.01)
*H04L 9/40* (2022.01)

(52) U.S. Cl.
CPC ........ *H04L 63/1425* (2013.01); *H04L 63/102* (2013.01); *H04L 63/1433* (2013.01); *H04L 63/20* (2013.01)

(58) Field of Classification Search
CPC ... H04L 63/20; H04L 63/1433; H04L 63/102; H04L 63/1425; H04L 47/20; H04W 12/08; H04W 12/37; H04W 48/02; H04W 12/02
See application file for complete search history.

(56) References Cited

U.S. PATENT DOCUMENTS

| | | |
|---|---|---|
| 7,685,271 B1 | 3/2010 | Schneider et al. |
| 8,407,798 B1 | 3/2013 | Lotem et al. |

(Continued)

FOREIGN PATENT DOCUMENTS

| | | |
|---|---|---|
| JP | 2015015581 A | 1/2015 |
| KR | 102500033 B1 | 2/2023 |
| WO | 2022198580 A1 | 9/2022 |

OTHER PUBLICATIONS

Matsumoto et al., "A Method of Preventing Unauthorized Data Transmission in Controller Area Network," 2012 IEEE 75th Vehicular Technology Conference (VTC Spring) Year: 2012 | Conference Paper | Publisher: IEEE.*

(Continued)

*Primary Examiner* — Roderick Tolentino
(74) *Attorney, Agent, or Firm* — Banner & Witcoff, Ltd.

(57) ABSTRACT

Aspects of the disclosure relate to real-time validation of data transmissions based on security profiles. A computing platform may collect, in real-time, information associated with a plurality of data transmissions between applications, where the information may include, for each data transmission, an indication of a source application and a destination application. Then, the computing platform may retrieve, from a repository and for each data transmission, a first security profile associated with the source application, and a second security profile associated with the destination application. The computing platform may then compare, for each data transmission, the first security profile to the second security profile. Subsequently, the computing platform may detect, based on a determination that the first security profile does not match the second security profile, a potentially unauthorized data transmission. Then, the computing platform may trigger one or more security actions to prevent the potentially unauthorized data transmission.

20 Claims, 6 Drawing Sheets

(56) References Cited

U.S. PATENT DOCUMENTS

| | | |
|---|---|---|
| 9,412,073 B2 | 8/2016 | Brandt et al. |
| 9,578,060 B1 | 2/2017 | Brisebois et al. |
| 9,692,731 B2 | 6/2017 | Acharya et al. |
| 9,696,346 B2 | 7/2017 | Pietrowicz et al. |
| 9,866,532 B2 | 1/2018 | Acharya et al. |
| 9,871,811 B2 | 1/2018 | Lambert et al. |
| 9,930,065 B2 | 3/2018 | Nelms et al. |
| 10,187,413 B2 | 1/2019 | Vasseur et al. |
| 10,454,950 B1 | 10/2019 | Aziz |
| 10,708,294 B2 | 7/2020 | Northway, Jr. et al. |
| 11,184,381 B2 | 11/2021 | Albero et al. |
| 11,297,085 B2 | 4/2022 | Albero et al. |
| 2010/0284288 A1 | 11/2010 | Lee et al. |
| 2012/0110345 A1* | 5/2012 | Pigeon .......... H04W 12/37 713/189 |
| 2012/0303476 A1* | 11/2012 | Krzyzanowski .......... G06F 8/60 705/26.5 |
| 2012/0331544 A1 | 12/2012 | Bostrom et al. |
| 2013/0198845 A1 | 8/2013 | Anvari |
| 2013/0298201 A1* | 11/2013 | Aravindakshan ... H04L 63/0272 726/4 |
| 2014/0013396 A1* | 1/2014 | Field-Eliot .......... H04L 63/0807 726/4 |
| 2015/0271201 A1 | 9/2015 | Ruvio et al. |
| 2016/0072709 A1 | 3/2016 | Moore |
| 2016/0088022 A1* | 3/2016 | Handa ................. H04L 63/0281 726/1 |
| 2016/0182559 A1 | 6/2016 | Francy et al. |
| 2016/0330222 A1 | 11/2016 | Brandt et al. |
| 2017/0099208 A1 | 4/2017 | Wang et al. |
| 2017/0149811 A1 | 5/2017 | Corrales et al. |
| 2017/0208077 A1 | 7/2017 | Freedman et al. |
| 2017/0244749 A1 | 8/2017 | Shulman et al. |
| 2018/0004152 A1 | 1/2018 | Nishino |
| 2018/0012486 A1 | 1/2018 | Israelsson |
| 2018/0020015 A1 | 1/2018 | Munro et al. |
| 2018/0048663 A1* | 2/2018 | Yura .................... H04L 63/1425 |
| 2018/0152523 A1* | 5/2018 | Lohse .................... H04N 21/60 |
| 2018/0159884 A1 | 6/2018 | Meier |
| 2018/0191782 A1* | 7/2018 | Djordjevic .......... H04L 63/0428 |
| 2018/0197105 A1 | 7/2018 | Luo et al. |
| 2018/0212985 A1 | 7/2018 | Zadeh et al. |
| 2018/0288063 A1 | 10/2018 | Koottayi et al. |
| 2018/0359259 A1 | 12/2018 | Leon |
| 2019/0068614 A1* | 2/2019 | Bhatnagar ............ G06Q 10/107 |
| 2019/0098019 A1* | 3/2019 | Coleman ................ H04L 63/145 |
| 2019/0104108 A1 | 4/2019 | Rhee et al. |
| 2020/0134083 A1 | 4/2020 | Elliman |
| 2020/0296126 A1 | 9/2020 | Compagna et al. |
| 2020/0380160 A1 | 12/2020 | Kraus et al. |
| 2021/0092132 A1 | 3/2021 | Bhatia et al. |
| 2021/0092138 A1 | 3/2021 | Clark et al. |
| 2021/0092153 A1 | 3/2021 | Wei et al. |
| 2021/0112091 A1 | 4/2021 | Compton |
| 2021/0211445 A1 | 7/2021 | Albero et al. |
| 2021/0211446 A1 | 7/2021 | Albero et al. |
| 2021/0250365 A1 | 8/2021 | Atkinson et al. |

OTHER PUBLICATIONS

Setyawan et al. "Web Services Security and Threats: A Systematic Literature Review," 2020 International Conference on ICT for Smart Society (ICISS)Year: 2020 | vol. CFP2013V-ART | Conference Paper | Publisher: IEEE.*

Matsumoto et al., A Method of Preventing Unauthorized Data Transmission in Contoller Area Network, 2012; IEEE 75th Vehicular Technology Conference (VTC Spring) Year: 2012; Conference Paper; Publisher IEEE.

F. Shaman, B. Ghita, N. Clarke and A. Alruban, "User Profiling Based on Application-Level Using Network Metadata," 2019 7th International Symposium on Digital Forensics and Security (ISDFS), 2019, pp. 1-8, doi: 10.1109/ISDFS.2019.8757503. (Year: 2019).

* cited by examiner

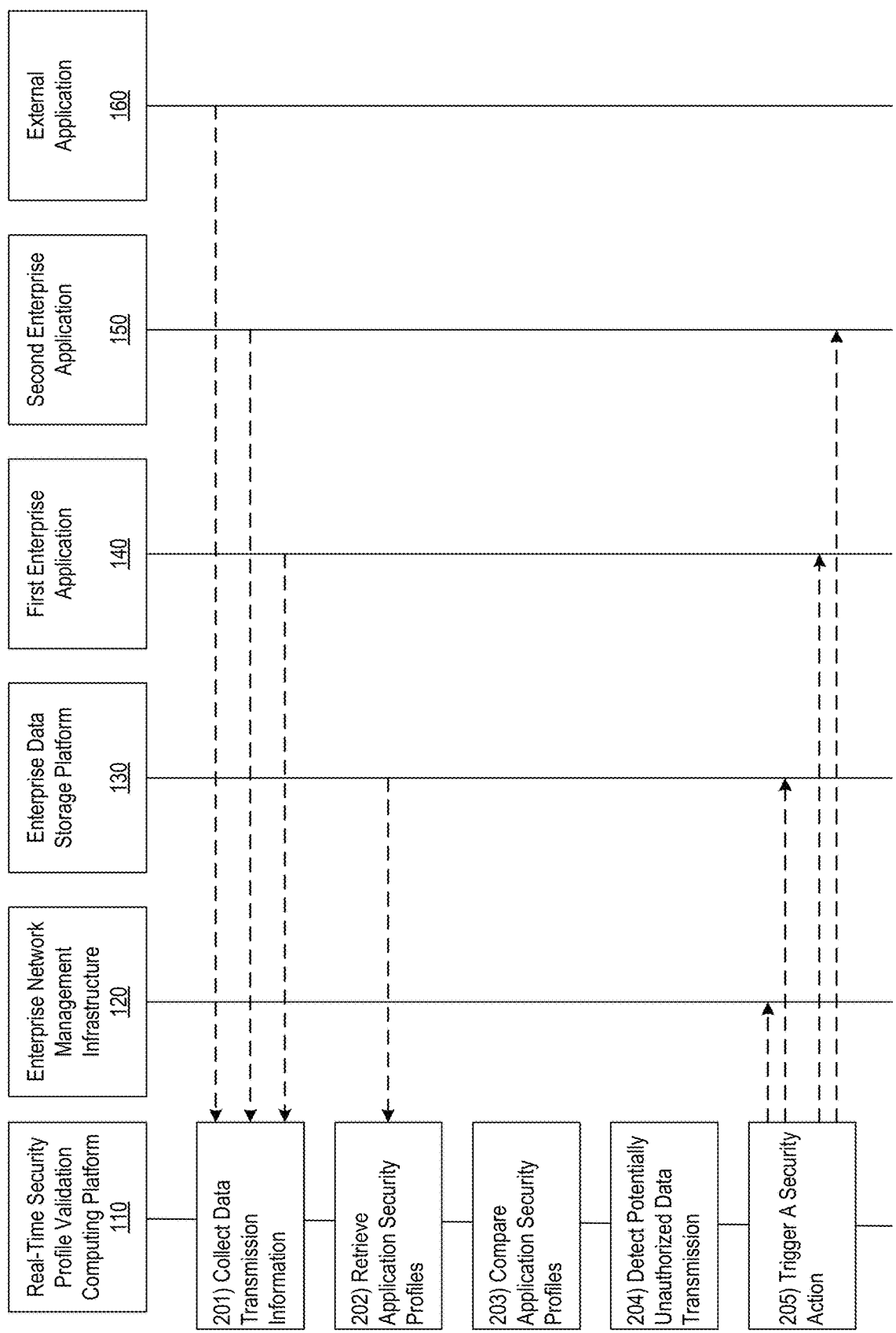

REAL-TIME VALIDATION OF DATA TRANSMISSIONS BASED ON SECURITY PROFILES

This application claims the benefit of and is a continuation of U.S. patent application Ser. No. 16/736,987, filed Jan. 8, 2020, and entitled "Real-Time Validation of Data Transmissions Based on Security Profiles". This application is incorporated by reference herein in its entirety.

BACKGROUND

Aspects of the disclosure relate to deploying digital data processing systems to protect enterprise resources. In particular, one or more aspects of the disclosure relate to real-time validation of data transmissions based on security profiles.

Enterprise organizations may utilize various resources to support their computing infrastructure. For large enterprise organizations, maintaining, updating, and managing network activity over the various enterprise resources may be of significant importance in protecting confidential information and/or other sensitive data that is created, transmitted, and/or used for various purposes. It may be helpful to analyze data flow between applications to identify anomalies in data transmission, such as, for example, if data is transmitted and/or received by applications with compatible security profiles, and/or if data is being misdirected to a different recipient, and/or if data is lost in transmission. As data flows through the network in real-time, such detection and management of network activity may be time-sensitive and there may be significant advantages for the detection and management to be performed in real-time as well. Ensuring that discrepancies in data flow may be detected, and timely and targeted remediation measures may be performed, in real time with speed and accuracy, may be particularly advantageous to ensure a smooth running of an enterprise infrastructure. In many instances, however, it may be difficult to analyze data flow, in an organization's complex network comprising a vast number of network devices and users, while also attempting to optimize network resources, bandwidth utilization, and efficient operations of the computing infrastructure.

SUMMARY

Aspects of the disclosure provide effective, efficient, scalable, fast, reliable, and convenient technical solutions that address and overcome the technical problems associated with real-time validation of data transmissions based on security profiles.

In accordance with one or more embodiments, a computing platform having at least one processor, a communication interface, and memory may collect, in real-time and via a computing device, information associated with a plurality of data transmissions between applications over a communications network, where the information may include, for each data transmission of the plurality of data transmissions, an indication of a source application and a destination application. Then, the computing platform may retrieve, via the computing device and from a repository and for each data transmission, a first security profile associated with the source application, and a second security profile associated with the destination application. The computing platform may then compare, via the computing device and for each data transmission, the first security profile to the second security profile. Subsequently, the computing platform may detect, based on a determination that the first security profile does not match the second security profile, a potentially unauthorized data transmission. Then, the computing platform may trigger, based on the detecting and via the computing device, one or more security actions to prevent the potentially unauthorized data transmission.

In some embodiments, the computing platform may identify a user associated with the source application, and where the retrieving the first security profile may include retrieving an entitlement associated with the user, and the comparing the first security profile to the second security profile may include comparing the entitlement with the second security profile.

In some embodiments, the computing platform may identify a first user associated with the source application. Then, the computing platform may identify a second user associated with the destination application. In some embodiments, the retrieving the first security profile may include retrieving a first entitlement associated with the first user, the retrieving the second security profile may include retrieving a second entitlement associated with the second user, and the comparing the first security profile to the second security profile may include comparing the first entitlement with the second entitlement.

In some embodiments, the computing platform may, prior to the retrieving the first security profile and the second security profile, and for each data transmission of the plurality of data transmissions, determine a first indication whether the data transmission was sent by the source application. Then, the computing platform may determine a second indication whether the data transmission was received by the destination application. Then, the computing platform may compare, via the computing device and in real-time and for each data transmission of the plurality of data transmissions, the first indication and the second indication. Subsequently, the computing platform may detect, via the computing device and based on a determination that the first indication does not match the second indication, an anomalous data transmission, where the retrieving the first security profile and the second security profile is performed for the anomalous data transmission.

In some embodiments, the one or more security actions may include analyzing, via the computing device, a content of the potentially unauthorized data transmission.

In some embodiments, the one or more security actions may include modifying, via the computing device, an entitlement of an enterprise user associated with the potentially unauthorized data transmission.

In some embodiments, a security profile associated with an application may include one or more of: an entitlement, a data classification, a use restriction, a risk profile, and a third-party policy.

In some embodiments, the one or more security actions may include modifying, via the computing device, one or more of the first security profile and the second security profile.

In some embodiments, the source application and the destination application may be associated with an enterprise organization.

In some embodiments, the source application may be associated with an enterprise organization, and the destination application may be associated with an external vendor organization.

In some embodiments, the one or more security actions may include preventing related data transmission.

In some embodiments, the one or more security actions may include generating, based on the detecting, a risk profile of an enterprise user associated with the potentially unauthorized data transmission, where the risk profile is indicative of a likelihood of the enterprise user to transmit secure enterprise information.

In some embodiments, the one or more security actions may include generating, based on the detecting, a risk profile of an application associated with the potentially unauthorized data transmission, where the risk profile is indicative of a likelihood of the application to transmit secure enterprise information.

In some embodiments, the one or more security actions may include generating a notification for an application manager to review the potentially unauthorized data transmission.

Implementations of the described techniques may include hardware, a method or process, or computer software on a computer-accessible medium.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 2 depicts an illustrative event sequence for a real-time validation of data transmissions based on security profiles in accordance with one or more example embodiments;

DETAILED DESCRIPTION

Figure 1A:
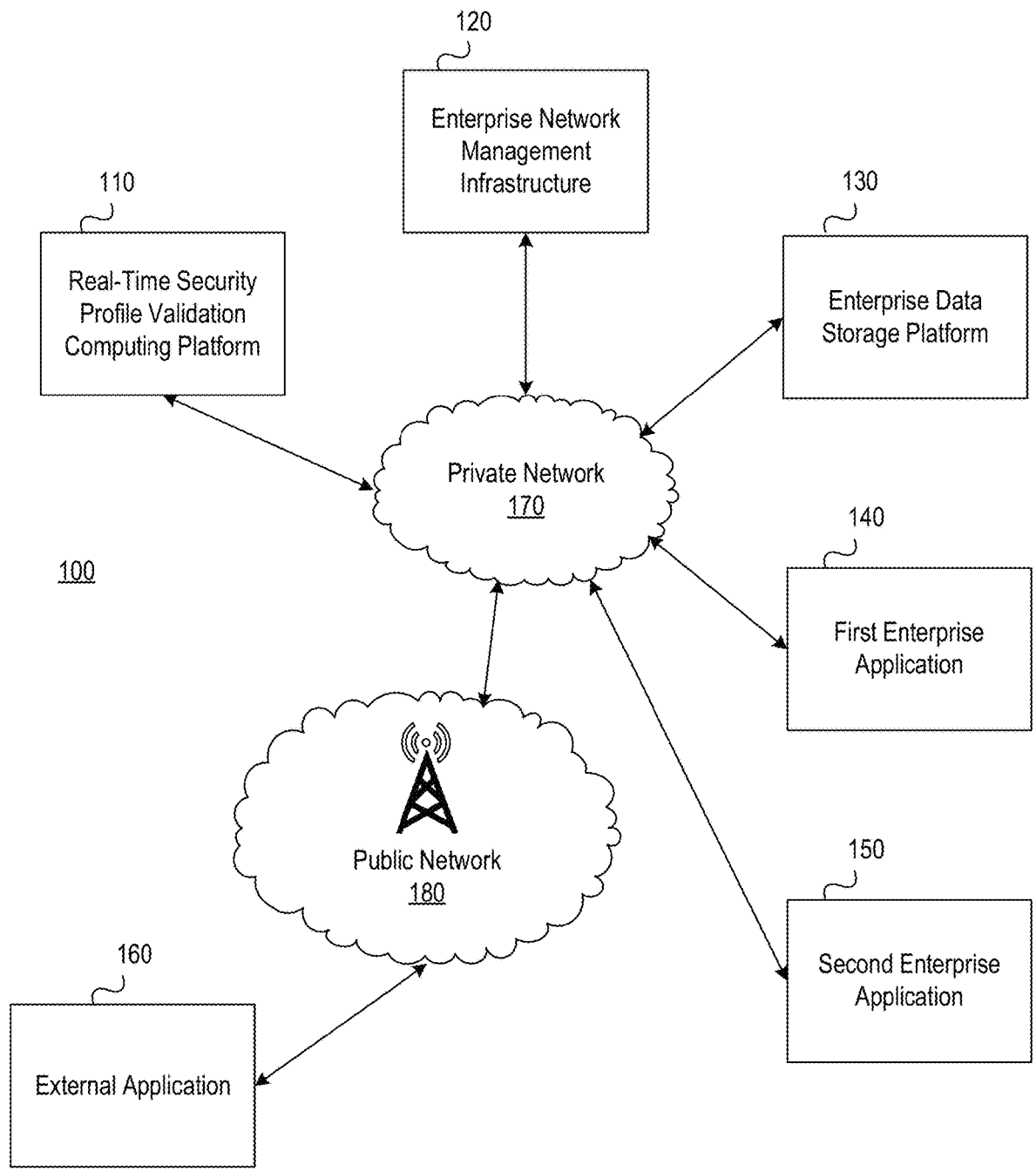
FIGS. 1A and 1B depict an illustrative computing environment for a real-time validation of data transmissions based on security profiles in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired, or wireless, and that the specification is not intended to be limiting in this respect.

Some aspects of the disclosure relate to a real-time validation of data transmissions based on security profiles, and triggering steps to mitigate the effects of such activity in a pro-active and timely manner. For example, an enterprise network management infrastructure may deploy computing resources such as network devices, web resources, file directories, software applications, and so forth. In some instances, user access may need to be restricted to some of the enterprise resources, based, for example, on an enterprise user's role within the enterprise organization, their risk profile, and application's use restrictions, and so forth. For large enterprise organizations with vast amounts of deployed resources and a large number of employees, a large amount of data may be exchanged between applications and/or users. Additionally, addition of new resources, changes in employment status of enterprise users, and/or changes in employee roles, may all create a dynamic and changing environment that may require to be monitored for potentially unauthorized data transmissions. In some instances, such data transmissions, unless adequately monitored, may pose a large security threat to the enterprise services. For large enterprise organizations with vast amounts of deployed resources and a large number of employees, data transmissions may take varied and complex forms, and may require real-time monitoring.

For example, it may be of significance to have accurate and complete information on what data is being transmitted between systems and applications. For example, confidential data may be exchanged between secured applications and it may be pertinent to know if a source application and a destination application of the data transmission are associated with compatible security profiles. Such information may be pertinent to prevent data leak, since a first application may be sending data to an intended recipient, and if the intended recipient is not authorized to receive the data, then there may be a need to timely intervention and/or remediation.

Generally, it may not be possible to manually manage such a vast array of network users and devices, with near-continuous flow of data. Accordingly, it may be of great significance for a large enterprise organization (e.g., financial institution), with large amounts of confidential information to protect, to detect, in real-time, potentially unauthorized data transmission, and to trigger appropriate security measures.

Accordingly, aspects of this disclosure relate to automated monitoring of source and destination information for data transmissions to identify potentially unauthorized data transmission in real-time, and initiate actions to mitigate such activities. Identifying such potentially unauthorized data transmission via a manual process and/or based on mental steps is unlikely because it relates to vast amounts of real-time network data traffic, and such network data traffic is rapidly changing in real-time over thousands of enterprise resources. Also, since the network data may reside and/or be exchanged over a vast array of users, internal and external applications, and network devices, it necessitates a use of computing devices specifically configured to access the information associated with the plurality of data transmissions over networks, compare respective security profiles and detect compatibility issues between users and/or applications, and initiate relevant action in real-time and over the network. It may be noted, that as data transmissions occur over a computing network, the problem of detecting potentially harmful activities across an enterprise infrastructure arises in the realm of networks, and as described herein, a solution is necessarily rooted in computer technology to overcome a problem arising in the realm of computer networks.

Figure 1B:
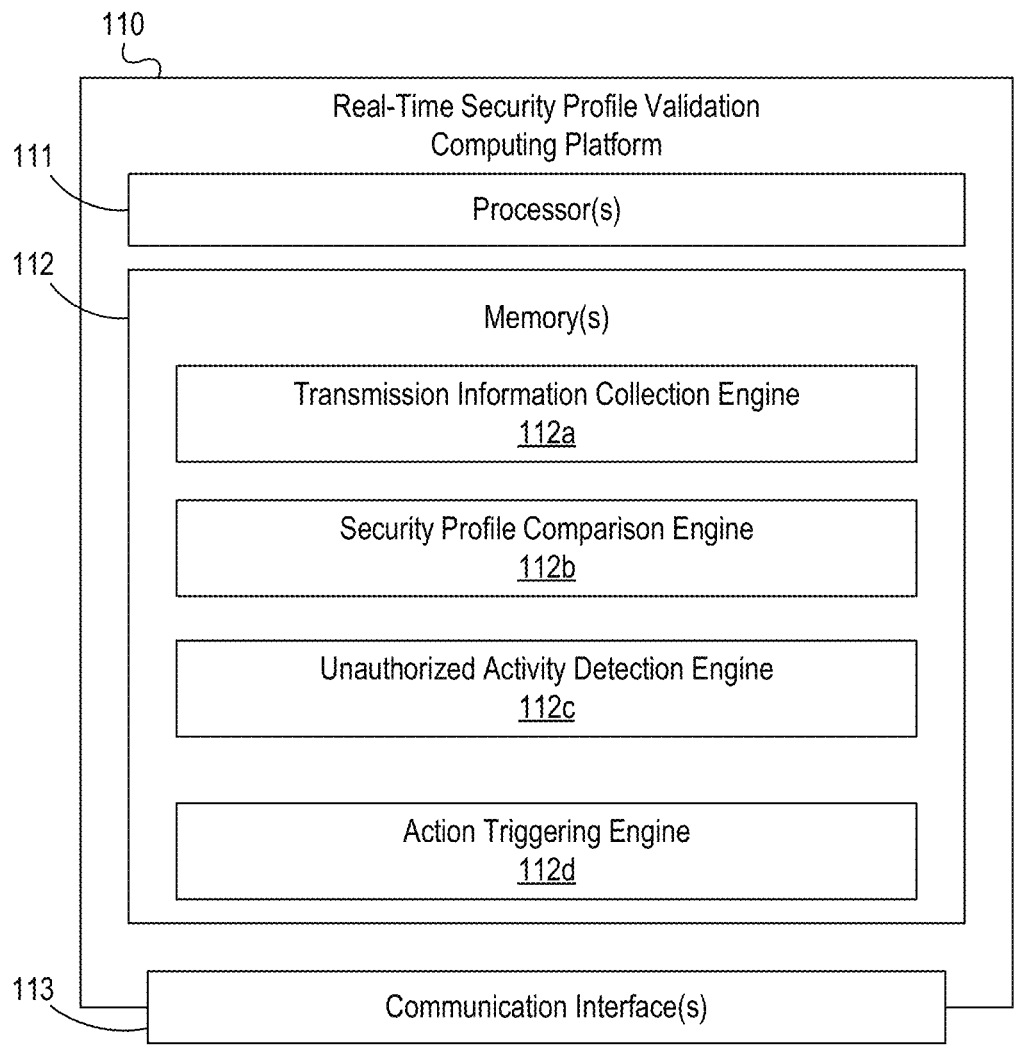

FIGS. 1A and 1B depict an illustrative computing environment for a real-time validation of data transmissions based on security profiles in accordance with one or more example embodiments. Referring to FIG. 1A, computing environment 100 may include one or more computer systems. For example, computing environment 100 may include real-time security profile validation computing platform 110, enterprise network management infrastructure 120, enterprise data storage platform 130, first enterprise application 140, second enterprise application 150, and external application 160.

As illustrated in greater detail below, real-time security profile validation computing platform 110 may include one or more computing devices configured to perform one or more of the functions described herein. For example, real-time security profile validation computing platform 110 may include one or more computers (e.g., laptop computers, desktop computers, servers, server blades, or the like) and/or other computer components (e.g., processors, memories, communication interfaces).

Enterprise network management infrastructure 120 may include one or more computing devices and/or other computer components (e.g., processors, memories, communication interfaces). In addition, enterprise network management infrastructure 120 may be configured to manage, host, execute, and/or otherwise provide one or more enterprise applications (e.g., first enterprise application 140, second enterprise application 150). For example, enterprise network management infrastructure 120 may be configured to manage, host, execute, and/or otherwise provide a computing platform for various network devices and enterprise applications. In some instances, enterprise network management infrastructure 120 may be configured to provide various enterprise and/or back-office computing functions for an enterprise organization, such as a financial institution. For example, enterprise network management infrastructure 120 may include various servers and/or databases that store and/or otherwise maintain account information, such as financial account information including account balances, transaction history, account owner information, and/or other information. Also, for example, enterprise network management infrastructure 120 may include various servers and/or databases that may manage information technology resources for the enterprise organization. For example, enterprise network management infrastructure 120 may include various servers and/or databases that may manage access controls to enterprise network devices. Generally, access controls may be allocated based on job functions, job roles, geographic region, and so forth. Additionally, or alternatively, enterprise network management infrastructure 120 may receive instructions from real-time security profile validation computing platform 110 and execute the instructions in a timely manner.

Enterprise data storage platform 130 may include one or more computing devices and/or other computer components (e.g., processors, memories, communication interfaces). In addition, and as illustrated in greater detail below, enterprise data storage platform 130 may be configured to store and/or otherwise maintain enterprise data, including access controls to network devices and/or other resources hosted, executed, and/or otherwise provided by enterprise network management infrastructure 120. Also, for example, enterprise data storage platform 130 may be configured to store and/or otherwise maintain information associated with data transmissions between enterprise applications (e.g., first enterprise application 140, second enterprise application 150), and/or between an enterprise application and an external vendor application (e.g., first enterprise application 140 and external application 160). As another example, enterprise data storage platform 130 may be configured to store and/or otherwise maintain information associated with security profiles for applications (e.g., first enterprise application 140, second enterprise application 150, external application 160). Additionally, or alternatively, enterprise network management infrastructure 120 may load data from enterprise data storage platform 130, manipulate and/or otherwise process such data, and return modified data and/or other data to enterprise data storage platform 130 and/or to other computer systems included in computing environment 100.

First enterprise application 140 and second enterprise application 150 may be applications utilized by the enterprise organization, and managed, hosted, executed, and/or otherwise provided by enterprise network management infrastructure 120. For example, first enterprise application 140 may be a financial application and second enterprise application 150 may be an accounting application. Also, for example, enterprise application 140 may be a travel reservation related application and second enterprise application 150 may be an expense management application. Also, for example, first enterprise application 140 may be a word processing application and second enterprise application 150 may be a telecommunications application. The term "enterprise application" as used herein, may generally refer to any application used within as enterprise organization. For example, an enterprise application may be a stand-alone application, or a suite of applications.

External application 160 may be an application provided by a vendor. For example, external application 160 may be a human resource application, a travel management application, a health insurance provider application, payment processing application, a voice over IP ("VOIP") service application, and so forth. The term "external application" as used herein, may generally refer to any application provided by an external vendor to an enterprise organization.

Enterprise applications and/or external applications may be related to billing and invoicing systems, payment processing systems, security investigation and mitigation systems, payroll systems, human resource systems, sales related platforms, production environment systems, product design and control systems, enterprise planning systems, enterprise resource management systems, web services hosting platforms, networks management tools, legal function management platforms, and so forth.

Computing environment 100 also may include one or more networks, which may interconnect one or more of real-time security profile validation computing platform 110, enterprise network management infrastructure 120, enterprise data storage platform 130, first enterprise application 140, second enterprise application 150, and external application 160. For example, computing environment 100 may include private network 170 (which may interconnect, for example, real-time security profile validation computing platform 110, enterprise network management infrastructure 120, and enterprise data storage platform 130, first enterprise application 140, second enterprise application 150, and/or one or more other systems (which may be associated with an organization, such as a financial institution), and public network 180 (which may interconnect, for example, external application 160 with private network 170 and/or one or more other systems, public networks, sub-networks, and/or the like). For example, public network 180 may interconnect external application 160 with first enterprise application 140 and/or second enterprise application 150 via private network 170. In some instances, public network 180 may be a high generation cellular network, such as, for example, a fifth generation ("5G") or higher cellular network. In some instances, private network 170 may likewise be a high generation cellular enterprise network, such as, for example, a 5G or higher cellular network.

In one or more arrangements, real-time security profile validation computing platform 110, enterprise network management infrastructure 120, enterprise data storage platform 130, first enterprise application 140, second enterprise application 150, and external application 160, and/or the other systems included in computing environment 100 may be any type of computing device capable of communicating with a user interface, receiving input via the user interface, and communicating the received input to one or more other computing devices. For example, real-time security profile validation computing platform 110, enterprise network management infrastructure 120, enterprise data storage platform 130, first enterprise application 140, second enterprise application 150, and external application 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of real-time security profile validation computing platform 110, enterprise network management infrastructure 120, enterprise data storage platform 130, first enterprise application 140, second enterprise application 150, and external application 160, may, in some instances, be special-purpose computing devices configured to perform specific functions.

Referring to FIG. 1B, real-time security profile validation computing platform 110 may include one or more processors 111, memory 112, and communication interface 113. A data bus may interconnect processor 111, memory 112, and communication interface 113. Communication interface 113 may be a network interface configured to support communication between real-time security profile validation computing platform 110 and one or more networks (e.g., public network, private network, a local network, or the like). Memory 112 may include one or more program modules having instructions that when executed by processor 111 cause real-time security profile validation computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of real-time security profile validation computing platform 110 and/or by different computing devices that may form and/or otherwise make up real-time security profile validation computing platform 110.

For example, memory 112 may have, store, and/or include transmission information collection engine 112a, security profile comparison engine 112b, unauthorized activity detection engine 112c, and action triggering engine 112d. Transmission information collection engine 112a may have instructions that direct and/or cause real-time security profile validation computing platform 110 to collect, in real-time and via a computing device, information associated with a plurality of data transmissions between applications over a communications network, where the information may include, for each data transmission of the plurality of data transmissions, an indication of a source application and a destination application.

Security profile comparison engine 112b may have instructions that direct and/or cause real-time security profile validation computing platform 110 to retrieve, via the computing device and from a repository and for each data transmission, a first security profile associated with the source application, and a second security profile associated with the destination application. Security profile comparison engine 112b may also have instructions that direct and/or cause real-time security profile validation computing platform 110 to compare, via the computing device and for each data transmission, the first security profile to the second security profile.

Unauthorized activity detection engine 112c may have instructions that direct and/or cause real-time security profile validation computing platform 110 to detect, based on a determination that the first security profile does not match the second security profile, a potentially unauthorized data transmission. Action triggering engine 112d may have instructions that direct and/or cause real-time security profile validation computing platform 110 to trigger, based on the detecting and via the computing device, one or more security actions to prevent the potentially unauthorized data transmission.

FIG. 2 depicts an illustrative event sequence for a real-time validation of data transmissions based on security profiles in accordance with one or more example embodiments. Referring to FIG. 2, at step 201, real-time security profile validation computing platform 110 may collect, in real-time and via a computing device, information associated with a plurality of data transmissions between applications over a communications network, where the information may include, for each data transmission of the plurality of data transmissions, an indication of a source application and a destination application.

As described herein, enterprise network management infrastructure 120 may be configured to manage, host, execute, and/or otherwise provide one or more enterprise applications. Network devices within enterprise network management infrastructure 120 may generate large volumes of data transmissions, including machine-generated transmissions. For example, network devices, such as, various servers and/or databases, sensors, routers, computing devices, printers, scanners, building entry verification devices, cameras, and so forth, may generate vast amounts of data. Additional devices may include, for example, web resources, firewalls, and/or operating systems. Such data may include, for example, access data, log data, location data, data on software updates, diagnostic data, user and/or account data, and so forth.

Real-time security profile validation computing platform 110 may collect data from a variety of sources, including, for example, via an application programming interface ("API"). In some embodiments, real-time security profile validation computing platform 110 may monitor an enterprise device via a device access manager, and/or device driver. Also, for example, data may be collected from log files (server log files, database log files, application activity files), network management devices, network routers, and so forth. For example, data packets sent over a network may include headers that list source and/or destination network nodes for the data packet, a communication path for the data packet, and so forth.

Generally, applications (e.g., first enterprise application 140, second enterprise application 150, external application 160) may communicate with one another to exchange information via data transmissions. For example, each data transmission may originate at an application (e.g., source application) and a second application (e.g., destination application) may be an intended recipient. For example, a source application may initiate a data transmission to request information, and the destination application may receive this request. In response, the destination application may provide the requested information by initiating a data transmission to the requesting (e.g., source) application. Data transmissions may include exchange of data packets over a network. Content of the data transmission may include electronic communication messages, HTML documents, word processing documents, media content, audio and/or visual content, data packets associated with telecommunications, and so forth.

In some embodiments, the source application and the destination application may be associated with an enterprise organization. For example, the source application may be, for example, first enterprise application 140, and the destination application may be, for example, second enterprise application 150. In some embodiments, the source application may be associated with an enterprise organization, and the destination application may be associated with an external vendor organization. For example, the source application may be, for example, first enterprise application 140, and the destination application may be, for example, external application 160. In some embodiments, the destination application may be associated with an enterprise organization, and the source application may be associated with an external vendor organization. For example, the source application may be, for example, external application 160, and the destination application may be, for example, second enterprise application 150.

In some embodiments, a security profile associated with an application may include one or more of: an entitlement, a data classification, a use restriction, a risk profile, and a third-party policy. For example, in a large enterprise organization (e.g., a financial institution), various enterprise applications may be deployed within the organization for enterprise users. Many such applications may have use restrictions based on a type of application, and a business role of an enterprise user.

Generally, an entitlement may be associated with an enterprise user or an enterprise system, where the entitlement indicates a type of information that the enterprise user and/or enterprise system may be entitled to send and/or receive. An entitlement may be based, for example, on a business role of the enterprise user within the enterprise organization. In some instances, the entitlement may be based on a physical and/or geographical location of the enterprise user. For example, an enterprise user logging in remotely may have entitlements that may be different from when the enterprise user may be within a secured facility, such as an office. Also, for example, an enterprise user traveling (e.g., to a foreign destination) may have entitlements that may be different from when the enterprise user may be within their allocated home region. A data transmission may include information about respective entitlements for a sender and/or recipient of the data transmission. In some embodiments, real-time security profile validation computing platform 110 may retrieve such entitlements from a data repository (e.g., enterprise data storage platform 130).

A use restriction, as used herein, generally refers to an attribute of an enterprise application (e.g., first enterprise application 140, second enterprise application 150), or that of an application provided by a third-party vendor (e.g., external application 160), where the attribute indicates, for example, a range of activities that enterprise users and/or enterprise systems may be able to perform via the application, the application-related resources that enterprise users and/or enterprise systems may have access to, and types of functions that enterprise users and/or enterprise systems may be allowed to perform on application data. For example, there may be a need for a web application to protect front-end and back-end data and system resources by implementing use restrictions on how users may interact with enterprise applications, what resources enterprise applications have access to, and what functions enterprise applications may be allowed to perform on the data. The use restrictions may facilitate protections against unauthorized viewing, modification, or copying of data.

A data classification, as used herein, may be a level of security associated with a content of a data transmission. For example, some data transmissions may include highly confidential information. Also, for example, some data transmissions may include no confidential information. In some instances, content of a data transmission may be updated as it may be exchanged between enterprise users, with each enterprise user adding to the content. In such instances, the data classification for the content may evolve over time, from one transmission to the next. Accordingly, it may be beneficial to correlate each data transmission with an entitlement and/or a use restriction. For example, an enterprise user and/or enterprise system associated with a certain entitlement may have access to data transmissions that include content with a particular type of data classification. As the content may be modified, changes in corresponding security protocols may not be authenticated, thereby leading to potentially unauthorized data transmissions to enterprise users and/or third-party vendors that do not have adequate access permissions.

In some embodiments, a risk profile may be associated with an enterprise user and/or an enterprise system. As described in detail herein, the risk profile of an enterprise user may be indicative of a likelihood of the enterprise user to send and/or receive secure enterprise information. Likewise, a risk profile of an application may be indicative of a likelihood of the application to transmit secure enterprise information. Risk profiles may be determined based on a number of factors, including, but not limited to, security threat landscape assessments for internal and external threats.

Third-party policies may be associated with a third-party vendor (e.g., external application 160), where such policies may indicate a range of activities that enterprise users and/or enterprise systems may be able to perform via the third-party vendor application, the application-related resources that enterprise users and/or enterprise systems may have access to, and types of functions that enterprise users and/or enterprise systems may be allowed to perform on application data. Third-party policies may also indicate a type of permissible interaction of enterprise users and/or enterprise systems with the third-party vendor application.

At step 202, real-time security profile validation computing platform 110 may retrieve, via the computing device and from a repository and for each data transmission, a first security profile associated with the source application, and a second security profile associated with the destination application. For example, real-time security profile validation computing platform 110 may retrieve, from a repository (e.g., enterprise data storage platform 130) a first security profile associated with the source application, and a second security profile associated with the destination application. For example, the first security profile associated with the source application may indicate that the source application may be authorized to send the data transmission. As another example, the second security profile associated with the destination application may indicate that the destination application may not be authorized to receive the data transmission.

Figure 3:
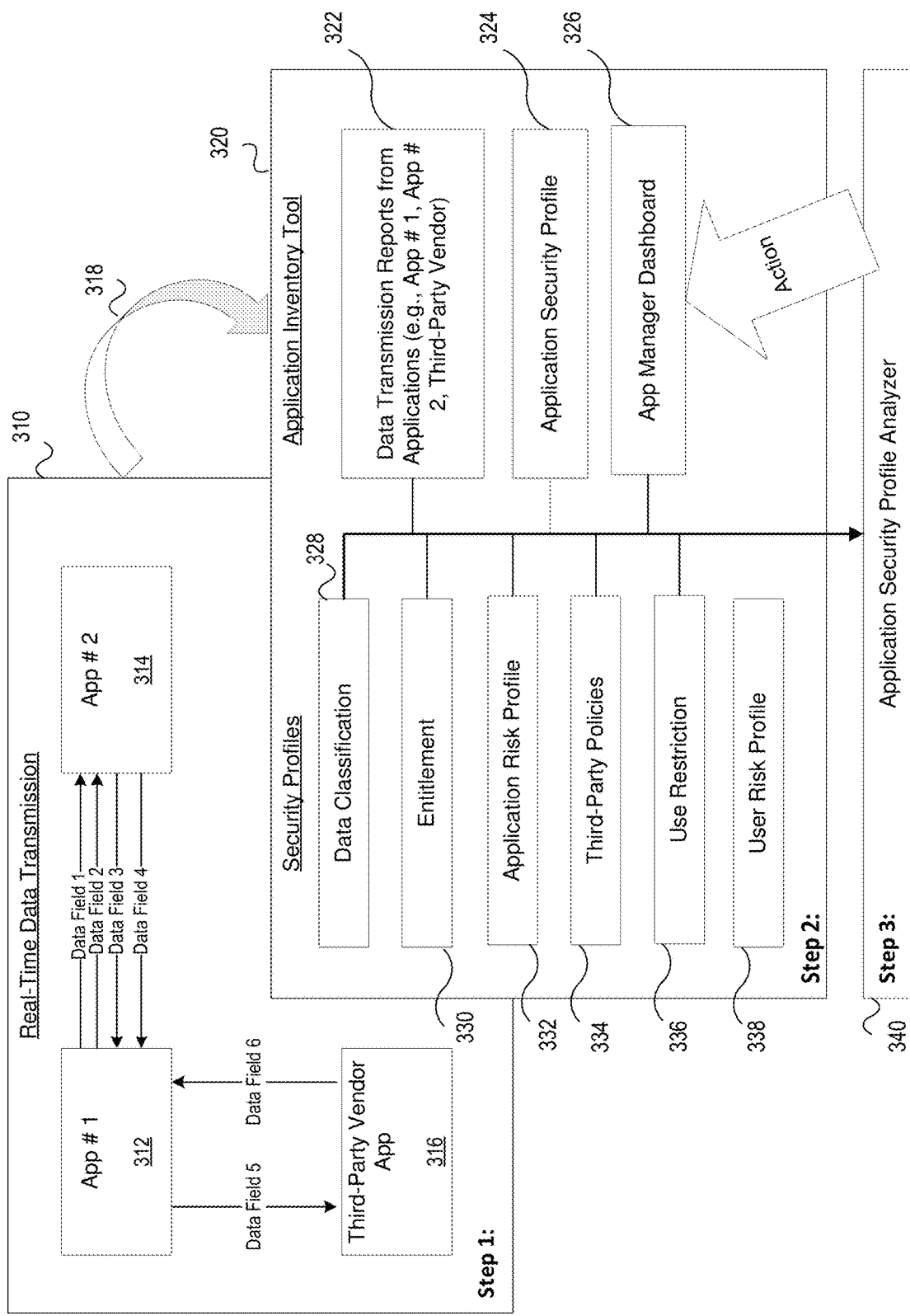
FIG. 3 depicts an illustrative method for a real-time validation of data transmissions based on security profiles in accordance with one or more example embodiments.

FIG. 3 depicts an illustrative method for a real-time validation of data transmissions based on security profiles in accordance with one or more example embodiments. At step 1, real-time data transmission 310 is depicted. App #1 312 may be, for example, first enterprise application 140; App #2 314 may be, for example, second enterprise application 150; and Third-party Vendor App 316 may be, for example, external application 160. As indicated, "Data Field 1" and "Data Field 2" may be sent by App #1 312 with App #2 314 as the intended recipient. Also, for example, "Data Field 3" and "Data Field 4" may be sent by App #2 314 with App #1 312 as the intended recipient. As another example, "Data Field 5" may be sent by App #1 312 with Third-party vendor app 316 as the intended recipient; whereas "Data Field 6" may be sent by Third-party vendor app 316 with App #1 312 as the intended recipient.

This information may be collected and provided to an Application Inventory Tool 320 (as indicated by arrow 318), which, at step 2, may display the information via an App Manager Dashboard 326 to an enterprise user, such as a security expert, who may optionally review the information from time to time. In some embodiments, App Manager Dashboard 326 may be provided as a graphical user interface. As data flows occurs over the network of devices and applications, the information may be updated in real-time. Although six data fields are shown for illustrative purposes, generally there may be millions of data fields.

As indicated, real-time security profile validation computing platform 110 may retrieve security profiles, including a data classification 328, an entitlement 330, an application risk profile 332, third-party policies 334, a use restriction 336, a user risk profile 338, and an application risk profile 324. In some embodiments, real-time security profile validation computing platform 110 may retrieve data transmission reports 322 from App #1 312, App #2 314, and/or Third-party vendor app 316. The data transmission reports 322 may include information about the data transmission, such as, for example, a timestamp, an identifier indicating a source and a destination, an identifier of an enterprise user and/or enterprise system associated with the source application and/or the destination application, a data classification for a content associated with the data transmission, and so forth. All such information from application inventory tool 320 may be provided to application security profile analyzer 340, which may, in turn correlate such information to determine an anomalous data transmission.

At step 203, real-time security profile validation computing platform 110 may compare, via the computing device and for each data transmission, the first security profile to the second security profile. Generally, each security profile may be associated with quantifiable parameters that may enable comparisons. For example, each entitlement may be represented symbolically thereby designating different enterprise users with symbols that may be indicative of their entitlement. Also, for example, each use restriction may be associated with a range of values and/or parameters that may indicate levels of access to an application. As another example, application risk profiles and user risk profiles may be associated with confidence scores and/or other discrete parameters that may be indicative of the respective risk profiles. Accordingly, for example, an entitlement and a risk profile may be compared quantitatively. For example, different levels of entitlements may be associated with different confidence levels for risk profiles, and real-time security profile validation computing platform 110 may make quantitative comparisons to determine an overlap.

Figure 4:
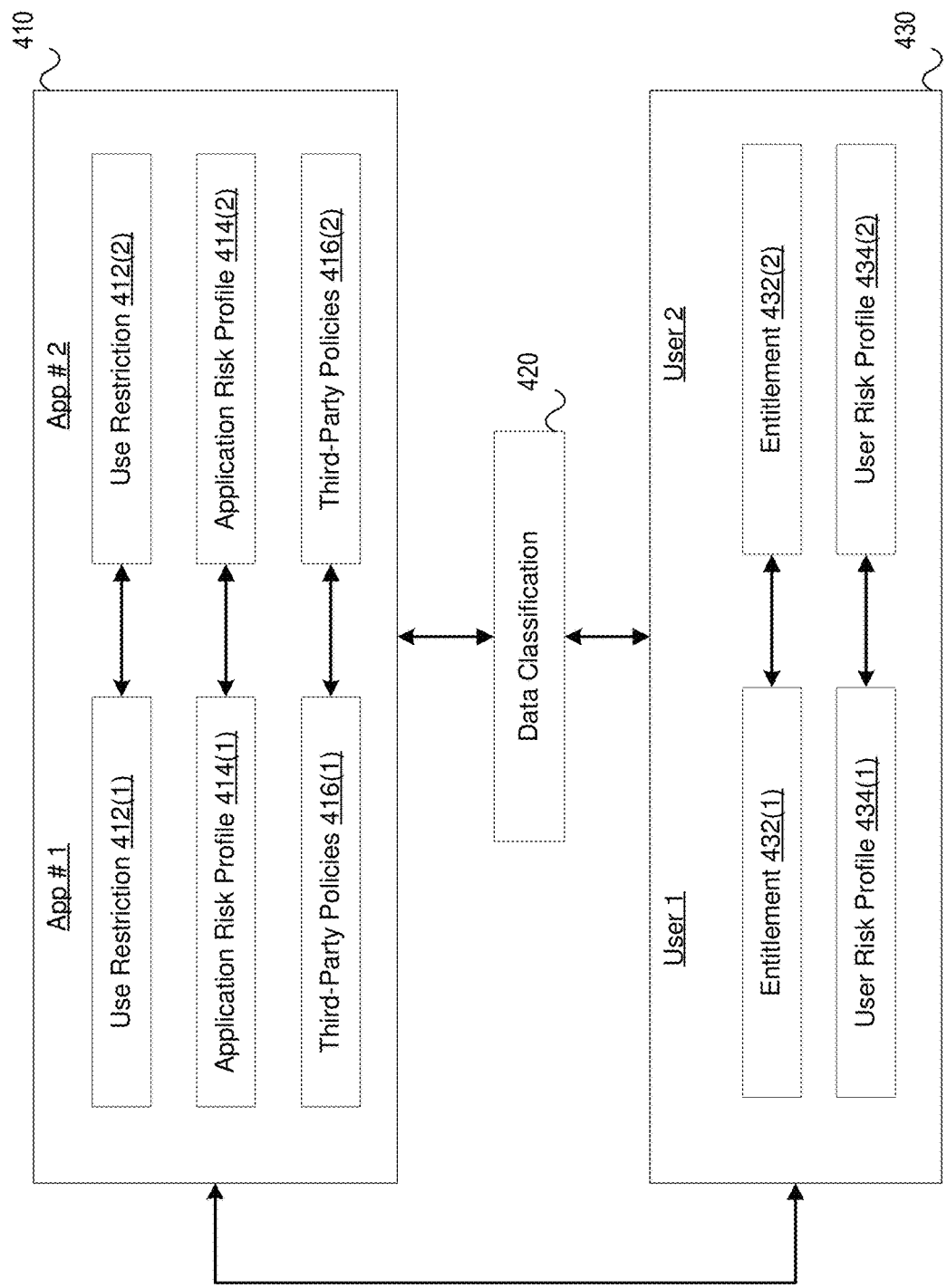
FIG. 4 depicts an illustrative example of security profiles associated with an application for a real-time validation of data transmissions based on security profiles in accordance with one or more example embodiments.

FIG. 4 depicts an illustrative example of security profiles associated with an application for a real-time validation of data transmissions based on security profiles in accordance with one or more example embodiments. As illustrated, at block 410, real-time security profile validation computing platform 110 may compare a first Use Restriction 412(1) associated with App #1 (e.g., first enterprise application 140) with second Use Restriction 412(2) associated with App #2 (e.g., second enterprise application 150). For example, App #1 (e.g., first enterprise application 140) may be an accounting application and first Use Restriction 412(1) may restrict App #1 to the enterprise organization's internal audit team, whereas App #2 (e.g., second enterprise application 150) may be a web resource application and second Use Restriction 412(2) may provide access to App #2 to all employees of the enterprise organization.

As another example, real-time security profile validation computing platform 110 may compare a first Application Risk Profile 414(1) associated with App #1 (e.g., first enterprise application 140) with second Application Risk Profile 414(2) associated with App #2 (e.g., second enterprise application 150). For example, App #1 (e.g., first enterprise application 140) may be associated with first Application Risk Profile 414(1) indicative of a higher vulnerability to external security threats, and App #2 (e.g., second enterprise application 150) may be associated with second Application Risk Profile 414(2) indicative of a lower level vulnerability to external security threats.

As another example, real-time security profile validation computing platform 110 may compare first Third-Party Policies 416(1) associated with App #1 (e.g., first enterprise application 140) with second Third-Party Policies 416(2) associated with App #2 (e.g., external application 160). For example, App #1 (e.g., first enterprise application 140) may be an internal data server hosting personal information, and first Third-Party Policies 416(1) may restrict outbound data transmission from App #1 to an external application associated with an external vendor, and App #2 may be an external application (e.g., external application 160) where second Third-Party Policies 416(2) may restrict inbound data transmission comprising personal information.

In some embodiments, real-time security profile validation computing platform 110 may compare a data classification 420 for a content associated with a data transmission to the security profiles. For example, real-time security profile validation computing platform 110 may compare data classification 420 with first Use Restriction 412(1) associated with App #1 (e.g., first enterprise application 140) and/or with second Use Restriction 412(2) associated with App #2 (e.g., second enterprise application 150). For example, real-time security profile validation computing platform 110 may compare data classification 420 with first Use Restriction 412(1) to determine if first Use Restriction 412(1) permits sending the data transmission comprising data with data classification 420 by App #1. Likewise, real-time security profile validation computing platform 110 may compare data classification 420 with second Use Restriction 412(2) to determine if second Use Restriction 412(2) permits receipt of the data transmission comprising data with data classification 420 by App #2.

As another example, real-time security profile validation computing platform 110 may compare data classification 420 with first Application Risk Profile 414(1) associated with App #1 (e.g., first enterprise application 140) and with second Application Risk Profile 414(2) associated with App #2 (e.g., second enterprise application 150). For example, real-time security profile validation computing platform 110 may compare data classification 420 with first Application Risk Profile 414(1) to determine if first Application Risk Profile 414(1) is compatible with transmitting a data transmission comprising data with data classification 420. Likewise, real-time security profile validation computing platform 110 may compare data classification 420 with second Application Risk Profile 414(2) to determine if second Application Risk Profile 414(2) is compatible with receiving a data transmission comprising data with data classification 420.

Also, for example, real-time security profile validation computing platform 110 may compare data classification 420 with first Third-Party Policies 416(1) associated with App #1 (e.g., first enterprise application 140) and with second Third-Party Policies 416(2) associated with App #2 (e.g., second enterprise application 150). For example, real-time security profile validation computing platform 110 may compare data classification 420 with first Third-Party Policies 416(1) to determine if first Third-Party Policies 416(1) permit sending the data transmission comprising data with data classification 420 by App #1. Likewise, real-time security profile validation computing platform 110 may compare data classification 420 with second Third-Party Policies 416(2) to determine if second Third-Party Policies 416(2) permit receipt of the data transmission comprising data with data classification 420 by App #2.

In some embodiments, real-time security profile validation computing platform 110 may compare data classification 420 with first Entitlement 432(1) associated with User 1 (corresponding to App #1), and with second Entitlement 432(2) associated with User 2 (corresponding to App #2). For example, User 1 may be a senior executive and first Entitlement 432(1) may provide User 1 access to confidential resources of the enterprise organization, and User 2 may be a legal professional advising User 1, and second Entitlement 432(2) may provide User 2 access to the same resources as User 1. In such instances, real-time security profile validation computing platform 110 may compare data classification 420 with first Entitlement 432(1) and second Entitlement 432(2) to determine if first Entitlement 432(1) and second Entitlement 432(2) may be compatible with exchanging a data transmission comprising data with data classification 420.

As another example, real-time security profile validation computing platform 110 may compare data classification 420 with first User Risk Profile 434(1) associated with User 1 (corresponding to App #1), and with second User Risk Profile 434(2) associated with User 2 (corresponding to App #2). For example, real-time security profile validation computing platform 110 may compare data classification 420 with first User Risk Profile 434(1) to determine if first User Risk Profile 434(1) is compatible with transmitting a data transmission comprising data with data classification 420. Likewise, real-time security profile validation computing platform 110 may compare data classification 420 with second User Risk Profile 434(2) to determine if second User Risk Profile 434(2) is compatible with receiving a data transmission comprising data with data classification 420.

In some embodiments, real-time security profile validation computing platform 110 may compare first Application Risk Profile 414(1) associated with App #1 (e.g., first enterprise application 140) with first Entitlement 432(1) associated with User 1 (corresponding to App #1). As another example, real-time security profile validation computing platform 110 may compare first Use Restriction 412(1) associated with App #1 (e.g., first enterprise application 140) with first User Risk Profile 434(1) associated with User 1 (corresponding to App #1). Additional and/or alternative comparisons may be performed by real-time security profile validation computing platform 110.

In some embodiments, real-time security profile validation computing platform 110 may identify a user associated with the source application, and the retrieving the first security profile may include retrieving an entitlement associated with the user, and the comparing the first security profile to the second security profile may include comparing the entitlement with the second security profile. For example, as illustrated at block 430 of FIG. 4, real-time security profile validation computing platform 110 may compare first Entitlement 432(1) associated with User 1 (corresponding to App #1), with second Entitlement 432(2) associated with User 2 (corresponding to App #2). Similarly, real-time security profile validation computing platform 110 may compare a first Entitlement 432(1) associated with User 1 (corresponding to App #1), with second User Risk Profile 434(2) associated with User 2 (corresponding to App #2). For example, User 1 may be a senior executive and first Entitlement 432(1) may provide User 1 access to confidential resources of the enterprise organization, and User 2 may be an enterprise user, and second User Risk Profile 434(2) may indicate if User 2 may receive a data transmission from User 1.

In some embodiments, real-time security profile validation computing platform 110 may identify a first user associated with the source application, and may identify a second user associated with the destination application. Real-time security profile validation computing platform 110 may then perform the retrieving the first security profile by retrieving a first entitlement associated with the first user, may perform the retrieving the second security profile by retrieving a second entitlement associated with the second user, and may perform the comparing the first security profile to the second security profile by comparing the first entitlement with the second entitlement.

For example, real-time security profile validation computing platform 110 may identify User 1 (corresponding to App #1) and User 2 (corresponding to App #2). Then, real-time security profile validation computing platform 110 may retrieve, from a repository (e.g., enterprise data storage platform 130), first Entitlement 432(1) associated with User 1, and may retrieve second Entitlement 432(2) associated with User 2. Finally, in some embodiments, real-time security profile validation computing platform 110 may compare first Entitlement 432(1) associated with User 1 (corresponding to App #1), with second Entitlement 432(2) associated with User 2 (corresponding to App #2). For example, User 1 may be a senior executive and first Entitlement 432(1) may provide User 1 access to confidential resources of the enterprise organization, and User 2 may be a legal professional advising User 1, and second Entitlement 432(2) may provide User 2 access to the same resources as User 1.

In some embodiments, real-time security profile validation computing platform 110 may compare first User Risk Profile 434(1) associated with User 1 (corresponding to App #1) with second User Risk Profile 434(2) associated with User 2 (corresponding to App #2). For example, User 1 may be associated with first User Risk Profile 434(1) indicative of a higher vulnerability to external security threats, and User 2 may be associated with second User Risk Profile 434(2) indicative of a lower vulnerability to external security threats.

As may be appreciated, given the nature of the network data, a large number of applications, and a volume of data transmission activity, it may be highly improbable for a human being to collect and/or compare data related to such network activity. In particular, a computing device would need to be configured to retrieve network data. Also, for example, due to the real-time nature of the collection activity, a computing device would need to be configured to retrieve and collate such data. Moreover, in comparing security profiles associated with the applications, a specialized computer would need to be configured to retrieve and compare the security profiles in real-time. Also, as may be appreciated, security profiles associated with applications may be retrieved from repositories, and may be compared to detect if an anomalous data transmission has occurred. Accordingly, processing such tasks by utilizing mental steps may be highly unlikely, and impractical. Also, for example, detecting an unauthorized data transmission in real-time may be of significant importance, so as to prevent and/or otherwise mitigate other data transmission. As such, the techniques, as described herein, actually prevent a normal, expected operation of a conventional computer by overriding sequences that may be routine and/or conventional, to detect the potentially unauthorized data transmission, and mitigate effects of such a transmission, thereby improving the technical functioning of the computer.

At step 204, real-time security profile validation computing platform 110 may detect, based on a determination that the first security profile does not match the second security profile, a potentially unauthorized data transmission. For example, referring again to FIG. 4, App #1 (e.g., first enterprise application 140) may be an accounting application and first Use Restriction 412(1) may restrict App #1 to the enterprise organization's internal audit team, whereas App #2 (e.g., second enterprise application 150) may be a web resource application and second Use Restriction 412(2) may provide access to App #2 to all employees of the enterprise organization. Accordingly, real-time security profile validation computing platform 110 may detect a data transmission from App #1 to App #2, and determine that first Use Restriction 412(1) does not match second Use Restriction 412(2). Based upon such a determination, real-time security profile validation computing platform 110 may determine that the data transmission may be a potentially unauthorized data transmission.

As another example, App #1 (e.g., first enterprise application 140) may be associated with first Application Risk Profile 414(1) indicative of a higher vulnerability to external security threats, and App #2 (e.g., second enterprise application 150) may be associated with second Application Risk Profile 414(2) indicative of a lower level vulnerability to external security threats. Accordingly, real-time security profile validation computing platform 110 may detect a data transmission from App #1 to App #2, and determine that first Application Risk Profile 414(1) does not match second Application Risk Profile 414(2). Based upon such a determination, real-time security profile validation computing platform 110 may determine that the data transmission may be a potentially unauthorized data transmission.

In some embodiments, real-time security profile validation computing platform 110 may determine, prior to the retrieving the first security profile and the second security profile, and for each data transmission of the plurality of data transmissions, a first indication whether the data transmission was sent by the source application, and a second indication whether the data transmission was received by the destination application. Real-time security profile validation computing platform 110 may then compare, via the computing device and in real-time and for each data transmission of the plurality of data transmissions, the first indication and the second indication, and detect, via the computing device and based on a determination that the first indication does not match the second indication, an anomalous data transmission. In some embodiments, the retrieving the first security profile and the second security profile may be performed for the anomalous data transmission.

In general, referring again to FIG. 3, when a data transmission may be sent from or received by a first application (e.g., first enterprise application 140), this information may be recorded in a first table that displays a report view (e.g., data transmission reports 322) for App #1 312 Likewise, when a data transmission may be sent from or received by a second application (e.g., second enterprise application 150), this information may be recorded in a second table that displays a report view (e.g., data transmission reports 322) for App #2 314. As data flows occur over the network of devices and applications, each of these tables may be updated in real-time. Accordingly, real-time security profile validation computing platform 110 may compare rows from different tables to determine if there is a match between a first indication that a data transmission was sent and a second indication that a data transmission was received. For example, real-time security profile validation computing platform 110 may identify a data transmission along with a source application (e.g., first enterprise application 140) and an intended destination application (e.g., second enterprise application 150). In some embodiments, real-time security profile validation computing platform 110 may access enterprise data storage platform 130 to retrieve an updated first table associated with the source application (e.g., App #1 312), and retrieve an updated second table associated with the intended destination application (e.g., App #2 314), to determine if there is a corresponding row in the updated second table, that indicates that the destination application received the data transmission.

In some embodiments, real-time security profile validation computing platform 110 may identify, from an inspection of the first table, that "Data Field 2" was transmitted by App #1 312 with App #2 314 as the intended recipient. However, upon inspecting the rows in the second table, real-time security profile validation computing platform 110 may detect that there is no row in the second table that corresponds to or matches the row of the first table that indicates that "Data Field 2" was sent. Accordingly, real-time security profile validation computing platform 110 may detect that the particular data transmission of "Data Field 2" was not received by App #2 314. Accordingly, transmission of "Data Field 2" may be identified as a potentially anomalous data transmission, and real-time security profile validation computing platform 110 may retrieve the first security profile and the second security profile for the potentially anomalous data transmission to further determine if an unauthorized data transmission has occurred.

Many large enterprises, such as, for example, financial institutions, may utilize various computing infrastructure to transact business with their customers. Such transactions may include secure enterprise information, such as confidential information, protected information, and/or other sensitive data that is created and/or used for various purposes. It may therefore a significant priority to protect the integrity and confidentiality of the underlying secure enterprise information and deter a breach of confidentiality, and/or data privacy. For example, as described, if two applications or a third-party vendor product may be communicating with each other, then each of them may report data (e.g., displayed in data transmission reports 322) that is sent and/or received. Accordingly, when real-time security profile validation computing platform 110 analyzes the reports from each application, it may find complementing information (data that was sent was also received by the intended recipient), or real-time security profile validation computing platform 110 may detect a discrepancy. Accordingly, by detecting data transmissions, real-time security profile validation computing platform 110 may identify data leaks where transmitted data is not received by the intended recipient, and/or incorrect data transmissions.

At step 205, real-time security profile validation computing platform 110 may trigger, based on the detecting and via the computing device, one or more security actions to prevent the potentially unauthorized data transmission. Generally, upon detecting the potentially unauthorized data transmission, real-time security profile validation computing platform 110 may take steps to further investigate the anomalous data transmission, and/or take steps to mitigate consequences of the potentially unauthorized data transmission. In some embodiments, the one or more security actions may include preventing related data transmissions. For example, real-time security profile validation computing platform 110 may identify the source application of the potentially unauthorized data transmission, and may automatically prevent the source application from sending related data transmissions. For example, the potentially unauthorized data transmission may be part of a stream of data packets that may be transmitted by the source application, and upon detecting the potentially unauthorized data transmission, real-time security profile validation computing platform 110 may intercept data packets in transit, and/or prevent future data packets from being transmitted (e.g., by first enterprise application 140). As another example, upon detecting the potentially unauthorized data transmission, real-time security profile validation computing platform 110 may identify an intended and/or actual destination for the potentially unauthorized data transmission, and prevent the intended and/or actual destination from receiving future data transmissions (e.g., by second enterprise application 150). As another example, when the destination application may be an external vendor application (e.g., external application 160), real-time security profile validation computing platform 110 may, upon detecting the potentially unauthorized data transmission, intercept related data transmissions prior to these transmissions exiting the enterprise system to be delivered to an external vendor (e.g., external application 160).

In some embodiments, the one or more security actions may include modifying, via the computing device, an entitlement of an enterprise user associated with an application. For example, upon detecting a potentially unauthorized data transmission, real-time security profile validation computing platform 110 may modify one or more entitlements for an enterprise user. For example, real-time security profile validation computing platform 110 may retrieve entitlements from enterprise data storage platform 130, modify them, store the modified entitlements on enterprise data storage platform 130, and/or send instructions to enterprise network management infrastructure 120 to modify the relevant entitlements. For example, real-time security profile validation computing platform 110 may prevent the enterprise user from accessing an external website, and/or may prevent the enterprise user from sending electronic mails (or not allow the enterprise user to attach documents).

In some embodiments, the one or more security actions may include modifying, via the computing device, one or more of the first security profile and the second security profile. For example, real-time security profile validation computing platform 110 may change entitlements for the enterprise user to enterprise resources and applications, may suspend or otherwise downgrade the enterprise user's risk profile, may notify enterprise security personnel of unauthorized activity, and/or suspected security breach, provide an alert to the enterprise user, alert a chain of management superior to the enterprise user, and so forth. Also, for example, real-time security profile validation computing platform 110 may change use restrictions for applications. In some embodiments, real-time security profile validation computing platform 110 may restrict access to the enterprise application that may be associated with the potentially unauthorized data transmission. In some embodiments, the potentially unauthorized data transmission real-time security profile validation computing platform 110 may change third-party policies for one or more vendor applications. For example, real-time security profile validation computing platform 110 may restrict user access to a vendor application unless the user may be on-site at an enterprise location.

In some embodiments, the one or more security actions may include generating, based on the detecting, a risk profile of an enterprise user associated with the potentially unauthorized data transmission, where the risk profile may be indicative of a likelihood of the enterprise user to transmit secure enterprise information. For example, a risk profile may be associated with an enterprise user based on a number of times an anomalous data transmission associated with the enterprise user may be detected. For example, an enterprise user may, while utilizing an enterprise application, send and/or receive data transmissions that may be identified as anomalous data transmissions. Accordingly, the enterprise user may be associated with such anomalous data transmissions. A frequency of such associations may be indicative of a potential data security breach. Accordingly, a risk profile may be generated for the enterprise user.

For example, each enterprise user may be associated with a numerical score indicative of a number of detected potentially unauthorized data transmissions associated with the enterprise user. In some embodiments, the risk profile may be based on a type of role for the enterprise user. For example, an enterprise user associated with access to highly confidential material may have a higher risk score associated with them. For example, if a potentially unauthorized data transmission is detected and is associated with an enterprise user with a lower security profile (e.g., a front desk reception personnel), a lower risk score may be associated with such activity. However, if a potentially unauthorized data transmission is detected and is associated with an enterprise user with a higher security profile (e.g., an executive with access to highly privileged information), a higher risk score may be associated with such activity. In some embodiments, real-time security profile validation computing platform 110 may identify security profiles based on existing entitlements associated with business roles, and may automatically determine a type of multiplier to be applied to an enterprise user's risk score based on a business role of the enterprise user.

In some embodiments, the one or more security actions may include generating, based on the detecting, a risk profile of an application associated with the potentially unauthorized data transmission, where the risk profile may be indicative of a likelihood of the application to transmit secure enterprise information. For example, a risk profile may be associated with an enterprise application based on a number of times a potentially unauthorized data transmission associated with the enterprise application is detected. For example, the enterprise application may send and/or receive a potentially unauthorized data transmission, and real-time security profile validation computing platform 110 may associate the enterprise application with the potentially unauthorized data transmission based on such activity. A frequency of such associations may be indicative of a potential data security breach. Accordingly, a risk profile may be generated for the enterprise application.

For example, each enterprise application may be associated with a numerical score indicative of a number of detected potentially unauthorized data transmissions associated with the enterprise application. In some embodiments, the risk profile may be based on a type of enterprise application. For example, an enterprise application associated with security related information may have a higher risk score associated with it. For example, if a potentially unauthorized data transmission is detected and is associated with an enterprise application with a lower security related profile (e.g., web resource with safe browsing links), a lower risk score may be associated with the enterprise application. However, if a potentially unauthorized data transmission is detected and is associated with an enterprise application with a higher security profile (e.g., a human resource application, a security monitoring application, an unauthorized user activity monitoring application), a higher risk score may be associated with the enterprise application. In some embodiments, real-time security profile validation computing platform 110 may identify security profiles based on existing security profiles associated with enterprise applications, and may automatically determine a type of multiplier to be applied to an enterprise application's risk score based on the security profile.

In some embodiments, the one or more security actions may include generating a notification for an application manager to review the potentially unauthorized data transmission. For example, real-time security profile validation computing platform 110 may generate a notification to an application manager to determine if they intend to send and/or receive a detected potentially unauthorized data transmission. As another example, real-time security profile validation computing platform 110 may generate a notification to a supervising manager responsible for an enterprise user associated with a potentially unauthorized data transmission. The supervising manager may then initiate one or more steps to further mitigate and/or prevent unauthorized activity by the enterprise user.

In some embodiments, the one or more security actions may include analyzing, via the computing device, a content of the potentially unauthorized data transmission. For example, upon detecting an anomalous data transmission, real-time security profile validation computing platform 110 may retrieve an actual content of the data transmission for further analysis. For example, if the data transmission is a textual communication, real-time security profile validation computing platform 110 may utilize text processing techniques to analyze the textual communication to determine and/or confirm unauthorized activity. In some embodiments, real-time security profile validation computing platform 110 may validate, authorize, and/or modify a data classification of the content associated with the data transmission. Also, for example, if the data transmission is an audio communication, real-time security profile validation computing platform 110 may utilize speech-to-text processing techniques and/or speech recognition techniques to analyze the audio communication to determine and/or confirm unauthorized activity. Additional, or alternate techniques may be utilized to further detect unauthorized activity associated with an anomalous data transmission.

Figure 5:
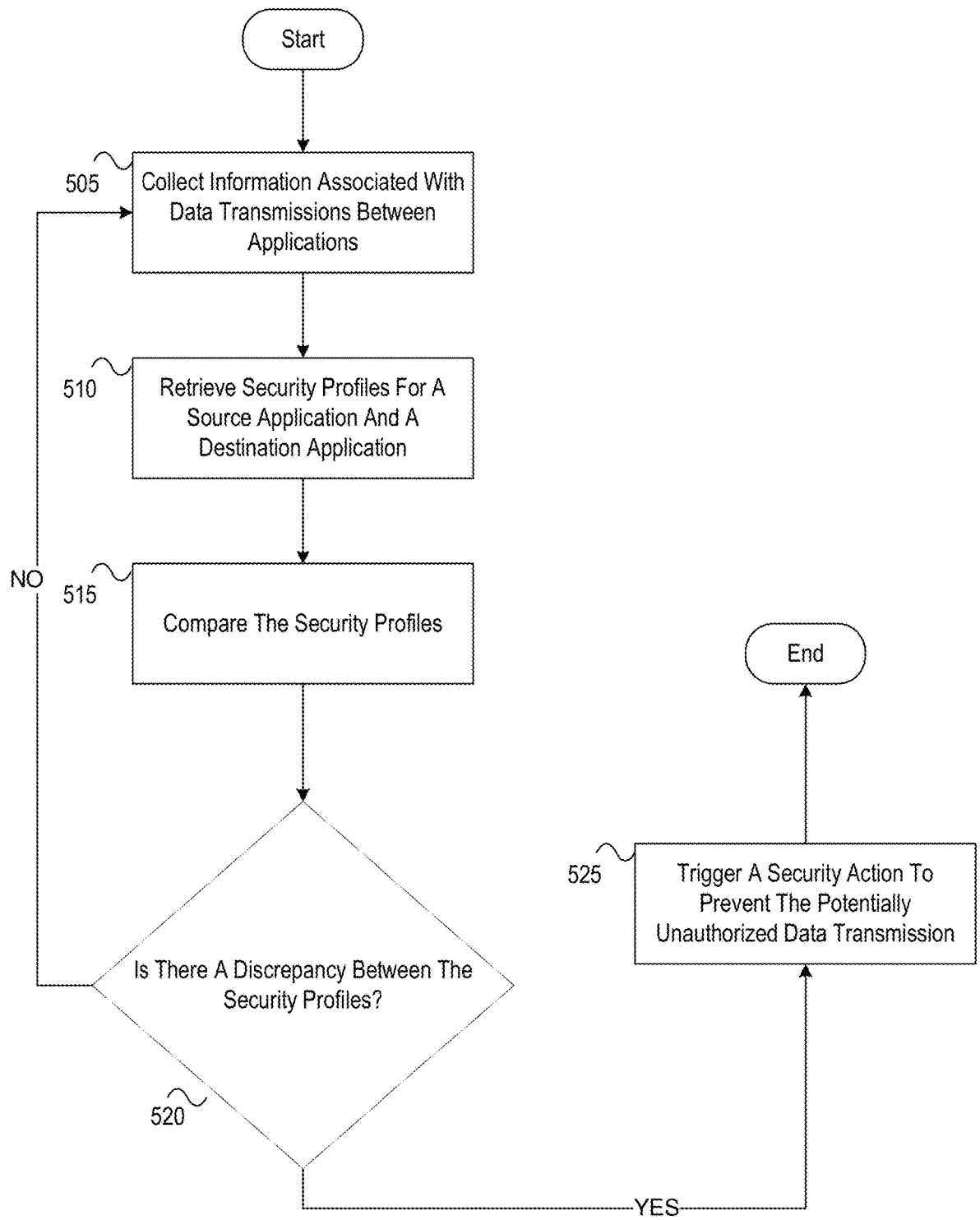
FIG. 5 depicts another illustrative method for a real-time validation of data transmissions based on security profiles in accordance with one or more example embodiments.

FIG. 5 depicts another illustrative method for a real-time validation of data transmissions based on security profiles in accordance with one or more example embodiments. Referring to FIG. 5, at step 505, a computing platform having at least one processor, a communication interface, and memory collect, in real-time and via a computing device, information associated with a plurality of data transmissions between applications over a communications network, where the information may include, for each data transmission of the plurality of data transmissions, an indication of a source application and a destination application. At step 510, the computing platform may retrieve, via the computing device and from a repository and for each data transmission, a first security profile associated with the source application, and a second security profile associated with the destination application. At step 515, the computing platform may compare, via the computing device and for each data transmission, the first security profile to the second security profile.

At step 520, the computing platform may determine if there is a discrepancy between the first security profile and the second security profile. If at step 520, the computing platform determines that there is a discrepancy between the first security profile and the second security profile, the process may proceed to step 525. At step 525, the computing platform may trigger, based on the detecting and via the computing device, one or more security actions to prevent the potentially unauthorized data transmission. If at step 520, the computing platform determines that there is no discrepancy between the first security profile and the second security profile, the process may return to step 505.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular time-sensitive tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to implement one or more aspects of the disclosure more effectively, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform, comprising:
   at least one processor;
   a communication interface communicatively coupled to the at least one processor; and
   memory storing computer-readable instructions that, when executed by the at least one processor, cause the computing platform to:
   collect, in real-time and via a computing device, information associated with a plurality of data transmissions between applications over a communications network, wherein the information comprises, for each data transmission of the plurality of data transmissions, an indication of a source application and a destination application;
   retrieve, via the computing device and from a repository and for each data transmission, a first security profile associated with the source application, and a second security profile associated with the destination application;
   compare, via the computing device and for each data transmission, the first security profile to the second security profile;
   detect, based on a determination that the first security profile does not match the second security profile, a potentially unauthorized data transmission;
   when the first and second security profiles do not match, trigger, based on the detecting and via the computing device, one or more security actions to prevent the potentially unauthorized data transmission; and
   when no discrepancy is detected between the first and second security profiles associated with the source and destination applications, respectively, continue to collect the information associated with the plurality of data transmissions between the source and destination applications.

2. The computing platform of claim 1, wherein the instructions, when executed by the at least one processor, cause the computing platform to identify a user associated with the source application, and
   wherein the retrieving the first security profile comprises retrieving an entitlement associated with the user, and
   wherein the comparing the first security profile to the second security profile comprises comparing the entitlement with the second security profile.

3. The computing platform of claim 1, wherein the instructions, when executed by the at least one processor, cause the computing platform to:
   identify a first user and a current location of the first user associated with the source application;
   identify a second user associated with the destination application;
   retrieve a first entitlement associated with the first user, wherein the first security profile includes the first entitlement and wherein the first entitlement is adjusted for the current location of the first user and wherein the first entitlement at a first location is different from the first entitlement at a second location;
   retrieve a second entitlement associated with the second user, wherein the second security profile includes the second entitlement; and
   compare the first entitlement with the second entitlement of the first and second security profiles, respectively.

4. The computing platform of claim 3, wherein the first location comprises a home region and the second location comprises a traveled destination of the first user.

5. The computing platform of claim 1, wherein the one or more security actions comprise analyzing, via the computing device, a content of the potentially unauthorized data transmission.

6. The computing platform of claim 1, wherein the one or more security actions comprise modifying, via the computing device, an entitlement of an enterprise user associated with the potentially unauthorized data transmission.

7. The computing platform of claim 1, wherein a security profile associated with an application comprises one or more of: an entitlement, a data classification, a use restriction, a risk profile, and a third-party policy.

8. The computing platform of claim 1, wherein the one or more security actions comprise modifying, via the computing device, one or more of the first security profile and the second security profile.

9. The computing platform of claim 1, wherein the source application and the destination application are associated with an enterprise organization.

10. The computing platform of claim 1, wherein the source application is associated with an enterprise organization, and the destination application is associated with an external vendor organization.

11. The computing platform of claim 1, wherein the one or more security actions comprise preventing, via the computing device, related data transmissions.

12. The computing platform of claim 1, wherein the one or more security actions comprise generating, based on the detecting, a risk profile of an enterprise user associated with the potentially unauthorized data transmission, and wherein the risk profile is indicative of a likelihood of the enterprise user to transmit secure enterprise information.

13. The computing platform of claim 1, wherein the one or more security actions comprise generating, based on the detecting, a risk profile of an application associated with the potentially unauthorized data transmission, and wherein the risk profile is indicative of a likelihood of the application to transmit secure enterprise information.

14. The computing platform of claim 1, wherein the one or more security actions comprise generating a notification for an application manager to review the potentially unauthorized data transmission.

15. A method, comprising:
at a computing platform comprising at least one processor, a communication interface, and memory:
collecting, in real-time and via a computing device, information associated with a plurality of data transmissions between applications over a communications network, wherein the information comprises, for each data transmission of the plurality of data transmissions, an indication of a source application and a destination application;
retrieving, via the computing device and from a repository and for each data transmission, a first security profile associated with the source application, and a second security profile associated with the destination application;
comparing, via the computing device and for each data transmission, the first security profile to the second security profile;
detecting, based on a determination that the first security profile does not match the second security profile, a potentially unauthorized data transmission;
when the first and second security profiles do not match, triggering, based on the detecting and via the computing device, one or more security actions to prevent the potentially unauthorized data transmission; and
when no discrepancy is detected between the first and second security profiles associated with the source and destination applications, respectively, continuing to collect the information associated with the plurality of data transmissions between the source and destination applications.

16. The method of claim 15, further comprising:
identifying a first user and a current location of the first user associated with the source application;
identifying a second user associated with the destination application;
retrieving a first entitlement associated with the first user, wherein the first security profile includes the first entitlement and wherein the first entitlement is adjusted for the current location of the first user and wherein the first entitlement at a first location is different from the first entitlement at a second location;
retrieving a second entitlement associated with the second user, wherein the second security profile includes the second entitlement; and
comparing the first entitlement with the second entitlement of the first and second security profiles, respectively.

17. The method of claim 15, wherein the one or more security actions comprise analyzing, via the computing device, a content of the potentially unauthorized data transmission.

18. The method of claim 15, further comprising preventing, via the computing device, related data transmissions.

19. One or more non-transitory computer-readable media storing instructions that, when executed by a computing platform comprising at least one processor, a communication interface, and memory, cause the computing platform to:
collect, in real-time and via a computing device, information associated with a plurality of data transmissions between applications over a communications network, wherein the information comprises, for each data transmission of the plurality of data transmissions, an indication of a source application and a destination application;
retrieve, via the computing device and from a repository and for each data transmission, a first security profile associated with the source application, and a second security profile associated with the destination application;
compare, via the computing device and for each data transmission, the first security profile to the second security profile;
detect, based on a determination that the first security profile does not match the second security profile, a potentially unauthorized data transmission;
when the first and second security profiles do not match, trigger, based on the detecting and via the computing device, one or more security actions to prevent the potentially unauthorized data transmission; and
when no discrepancy is detected between the first and second security profiles associated with the source and destination applications, respectively, continue to collect the information associated with the plurality of data transmissions between the source and destination applications.

20. The one or more non-transitory computer-readable media of claim 19, wherein the instructions, when executed by a computing platform, further cause the computing platform to:
identify a first user and a current location of the first user associated with the source application;
identify a second user associated with the destination application;
retrieve a first entitlement associated with the first user, wherein the first security profile includes the first entitlement and wherein the first entitlement is adjusted for the current location of the first user and wherein the first entitlement at a first location is different from the first entitlement at a second location;
retrieve a second entitlement associated with the second user, wherein the second security profile includes the second entitlement; and
compare the first entitlement with the second entitlement of the first and second security profiles, respectively.

* * * * *